United States Patent [19]

Smith

[11] Patent Number: 5,782,520
[45] Date of Patent: Jul. 21, 1998

[54] BED LINER RETAINER

[75] Inventor: Kevin L. Smith, Ayden, N.C.

[73] Assignee: Atwell Industries, Inc., Ayden, N.C.

[21] Appl. No.: 666,944

[22] Filed: Jun. 19, 1996

[51] Int. Cl.[6] .................................................. B60R 13/01
[52] U.S. Cl. .................................................. 296/39.2
[58] Field of Search .................................................. 296/39.2

[56] References Cited

U.S. PATENT DOCUMENTS

| | | | |
|---|---|---|---|
| 5,007,671 | 4/1991 | Oprea | 296/39.2 |
| 5,370,436 | 12/1994 | Martindale et al. | 296/39.2 |
| 5,540,473 | 7/1996 | Bills | 296/39.2 |

Primary Examiner—Gary C. Hoge
Attorney, Agent, or Firm—Sughrue, Mion, Zinn, Macpeak & Seas, PLLC

[57] ABSTRACT

A pickup truck bed liner is provided with an inwardly extending column-shaped projection adjacent the rear end of each side wall of the bed liner for close fitting engagement with vertically extending posts adjacent the end of each truck bed side wall. The upper edge of the bed liner is adapted to be fitted beneath the truck bed rail and an integral projection is formed on an upper edge portion of each side wall adjacent the column-shaped projection for engagement with a flange of each truck bed rail to secure the bed walls against movement relative to the truck bed side walls and support posts.

3 Claims, 2 Drawing Sheets

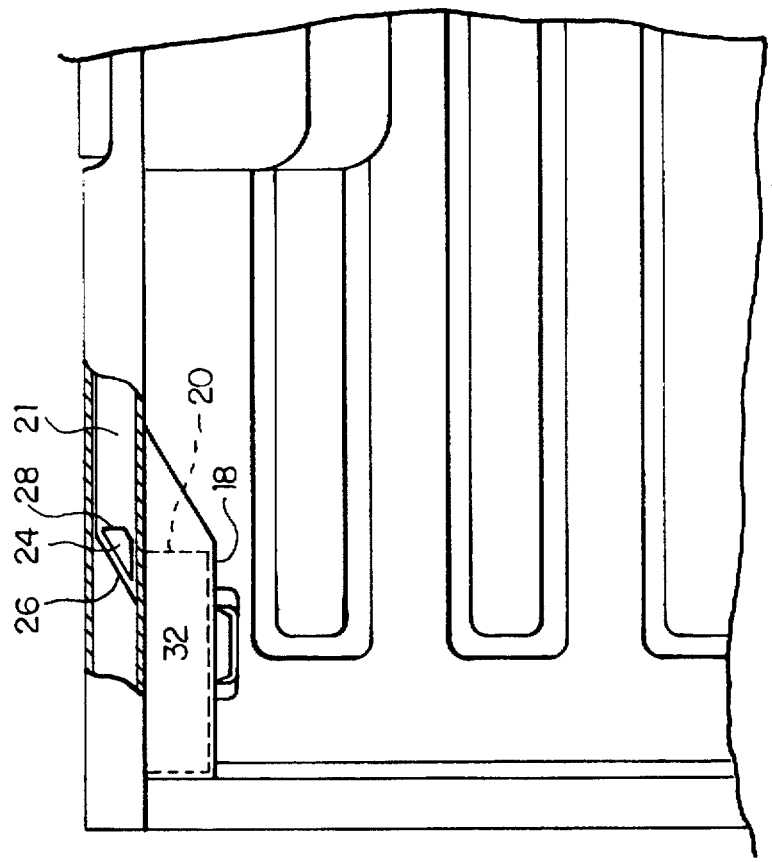

BED LINER RETAINER

BACKGROUND OF THE INVENTION

The present invention is directed to a bed liner retainer for an under the rail bed liner and more specifically to a projection on the upper edge of each bed liner side wall adjacent the rear end thereof for engagement with the in turned rail of each side wall of the pickup truck bed.

When a pickup truck bed liner is installed in a pickup truck bed, it is necessary to secure the bed liner against lengthwise movement within the truck bed as well as to retain the relatively floppy side walls of the bed liner against the side walls of the truck bed. This is frequently carried out by means of detachable locking tabs which are associated with the upper edges of the side walls of the bed liner and which cooperate with the truck bed rail. An example of such detachable locking tabs is found in U.S. Pat. No. 5,100,193. Another variation of truck bed liner securing devices is found in U.S. Pat. No. 5,007,671. In this patent, the bed liner is provided with two upstanding tabs along the top edge of each side for snap engagement under the rail of the pickup truck bed. However, these tabs are not associated with the rear post of the pickup truck bed in a manner which would prevent longitudinal movement of the bed liner relative to the truck bed.

SUMMARY OF THE INVENTION

The present invention is directed to a new and improved bed liner retainer wherein the rear end of each side wall of the truck bed liner is provided with an inwardly projecting column-shaped portion which is adapted to accommodate and engage the rear post which is integral with the side wall of the truck bed adjacent the rear end of the truck bed. An outstanding projection is formed on the upper edge of a side wall portion of the column-shaped projection for engagement inside the downwardly turned truck bed rail to hold the side wall of the truck bed liner against the side wall of the truck bed while preventing longitudinal movement of the truck bed.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIG. 2 is a top plan view, partially broken away, of the truck bed liner secured against the side wall of the truck bed.

DETAILED DESCRIPTION OF THE INVENTION

Figure 1:
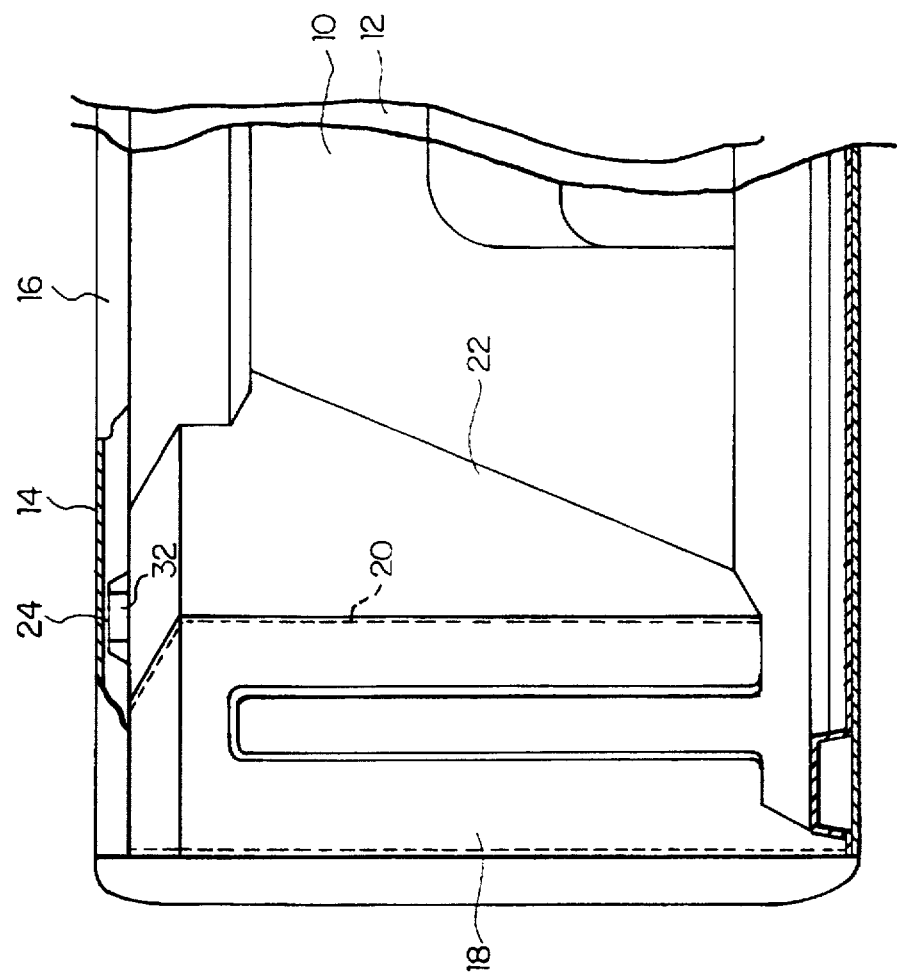
FIG. 1 is a side elevational view, partially broken away, showing the side wall of a truck bed liner secured beneath the rail of a truck bed.

A truck bed liner is generally comprised of a front wall, two side walls and a bottom wall which are integrally molded together for close fitting engagement with the corresponding components of a pickup truck bed. The rear end portion 10 of a bed liner side wall is shown in engagement with the side wall 12 of a pickup truck bed having a truck bed rail 14 with an inwardly and downwardly extending flange 16. The side wall of the pickup truck bed liner is provided with an inwardly projecting column-shaped portion 18 adjacent the rear end of the side wall 10 which is adapted to closely conform to the conventional support post 20 adjacent the rear end of the truck bed side wall 12 and an outwardly extending flange 21. The column-shaped projection 18 is provided with an angled side wall 22. The pickup truck bed liner is of the under-the-rail type wherein the upper edge of the pickup truck bed liner side wall 10 is disposed under the rail 16 of the truck bed.

An upstanding projection 24 is integrally formed on the outwardly extending flange 21 adjacent the angled side wall 22 and is adapted to snap under the flange 16 of the pickup truck bed rail 14. The side walls 26 and 28 are bevelled to facilitate the sliding of the projection under the flange 16 while the side wall 32 of the projection 24 is disposed perpendicular to the upper surface of the angled portion 22 to provide a firm engagement with the lower edge of the flange 16. Thus the projection 24 will secure the side wall 10 of the bed liner against the side wall 12 of the truck bed and since it is disposed immediately adjacent the column-shaped projection 18 which closely fits about the post 20, the truck bed liner will be prevented from sliding rearwardly relative to the truck bed.

While the invention has been particularly shown and described with reference to preferred embodiments thereof, it will be understood by those in the art that the foregoing and other changes in form and details may be made therein without departing from the spirit and scope of the invention.

What is claimed is:

1. A pickup truck bed liner for a pickup truck bed having side walls with an integral inwardly extending post at a rear end of each side wall and an inwardly extending rail having a downwardly extending flange on each rail, said bed liner comprising a pair of side walls engageable with the side walls of the truck bed beneath the rail of each side wall of the truck bed, each bed liner side wall having a column-shaped first projection adjacent a rear end thereof for close fitting engagement with the post at the rear end of a corresponding truck side wall and a second projection on an upper outwardly extending flange portion of the first projection for engagement with the flange of the truck bed rail to retain the bed liner side wall against the truck bed wall and the post to prevent rearward movement of the bed liner relative to the truck bed.

2. A pickup truck bed liner as set forth in claim 1, wherein said projection is integrally molded with said bed liner in one piece.

3. A pickup truck bed liner as set forth in claim 2, wherein said second projection is provided with a first side wall extending substantially parallel to the bed liner side wall and extending substantially perpendicular to said upper flange portion for engaging said flange of said truck bed rail and additional bevelled side walls to facilitate sliding of said projection beneath said flange of said pickup truck.

* * * * *